(12) United States Patent
Grishin et al.

(10) Patent No.: US 7,180,304 B2
(45) Date of Patent: Feb. 20, 2007

(54) METHOD OF INTERROGATING A BARCODE

(75) Inventors: Alexander M. Grishin, Skarholmen (SE); Ramos M. Mays, Ash Grove, MO (US)

(73) Assignee: Somark Innovations, Inc., St. Louis, MO (US)

( * ) Notice: Subject to any disclaimer, the term of this patent is extended or adjusted under 35 U.S.C. 154(b) by 0 days.

(21) Appl. No.: 11/450,553

(22) Filed: Jun. 8, 2006

(65) Prior Publication Data

US 2006/0284623 A1    Dec. 21, 2006

Related U.S. Application Data

(62) Division of application No. 11/297,832, filed on Dec. 7, 2005.

(60) Provisional application No. 60/594,961, filed on May 23, 2005.

(30) Foreign Application Priority Data

Dec. 9, 2004   (SE)   ................... 0402996

(51) Int. Cl.
*G01R 27/04* (2006.01)
*G01R 27/32* (2006.01)

(52) U.S. Cl. ..................... 324/637; 324/642
(58) Field of Classification Search ............... 324/637, 324/642
See application file for complete search history.

(56) References Cited

U.S. PATENT DOCUMENTS 6,330,939 B1 * 12/2001 Pratt .......................... 194/206
6,427,922 B1 *  8/2002 Marchand ................... 235/494
6,526,984 B1    3/2003 Nilsson et al.
6,734,420 B2    5/2004 Empedocles et al.
6,753,830 B2    6/2004 Gelbman (Continued)

FOREIGN PATENT DOCUMENTS

EP     1 065 623 A2    1/2001

OTHER PUBLICATIONS

Choong-Rae Cho, et al., Thickness dependent performance of $Na_{0.5}K_{0.5}NbO_3$/sapphire thin film varactors; *Integrated Ferroelectrics*, 2001, vol. 39, pp. 403-410.

(Continued)

*Primary Examiner*—Andrew H. Hirshfeld
*Assistant Examiner*—Amy He
(74) *Attorney, Agent, or Firm*—Wilson Sonsini Goodrich & Rosati

(57) ABSTRACT

Presented is a system and method for reading a microwave readable barcode formed from a pattern of dielectric material. The dielectric pattern creates a strong microwave contrast with the surrounding media selectively resonating with or scattering an interrogating microwave signal. Dielectric bars can be fabricated by inkjet printing, injection, spraying, drawing or any other technique. Barcode information is encoded using different lengths, angles, or positions of dielectric bars. A microwave readable dielectric barcode system includes a barcode fabricated from a dielectric material, a transmitter with an antenna, and a sensor that senses the effect produced by the dielectric barcode on the microwave signal. The dielectric barcode system can use multiple microwave signals that differ in one or more respects, such as polarization or frequency.

7 Claims, 3 Drawing Sheets

U.S. PATENT DOCUMENTS 6,819,244 B2 11/2004 Dukler et al.
2004/0026684 A1 2/2004 Empedocles

OTHER PUBLICATIONS

Choong-Rae Cho[a], et al., Ferroelectric Na0.5K0.5NbO3 Thin Films by Pulsed Laser Deposition; *Integrated Ferroelectrics*, 2000, vol. 31, pp. 35-46; pp. 35[351]-45[361].

M. Ahtee, et al.; Structural Phase Transitions in Sodium-Potassium Niobate Solid Solutions by Neutron Powder Diffraction; *Acta Cryst.*, 1978, A34, 309-317.

Choong-Rae Cho[a], et al., $Na_{0.5}K_{0.5}NbO_3$ thin films for voltage controlled acoustoelectric device applications, *Applied Physics Letters*, Apr. 29, 2002, vol. 80, No. 17, pp. 3171-1763.

S. Abadei[a]), et al., Low-frequency and microwave performaces of laser-ablated epitaxial $Na_{0.5}K_{0.5}NbO_3$ films on high-resistivity $SiO_2$/Si substrates; *Journal of Applied Physics*; Feb. 15, 2002, vol. 91, No. 4, pp. 2264-2276.

Choong-Rae Cho, et al., Na0.5K0.5NbO3/SiO2/Si thin film varactor: *Applied Physics Letters*, Mar. 27, 2000, vol. 76, No. 13, pp. 1761-1763.

Jang-Yong Kim, et al., Na0.5K0.5NbO3 Film Microwave Varactors: *Integrated Ferroelectrics*, 2004, vol. 66, pp. 291-300.

Choong-Rae Cho, et al., Background oxygen effects on pulsed laser deposited $Na_{0.5}K_{0.5}NbO_3$ films: from superparaelectric state to ferroelectricity, *Journal of Applied Physiscs*, May 1, 2000, vol. 87, No. 9, pp. 4439-4448.

S. Abadei[a]), DC field dependent properties of $Na_{0.5}$ K0.5NbO$_3$/SiO$_2$/Si structures at millimeter-wave frequencies; *Applied Physics Letters*, Mar. 26, 2001, vol. 78, No. 13, pp. 1900-2276.

Ramos M. Mays; Microwave Readable Ferroelectric Barcode; pp. 1-66.

Alexander M. Grishin, et al., Processing and On-Wafer Measurements of Ferroelectric Intergitated Tunable Microwave Capacitors; *Mat. Res. Soc. Symp. Proc.*, 2004, vol. 811, pp. D10.1.1-D10.1.6.

Choong-Rae Cho, et al., Self-assembling ferroelectric $Na_{0.5}K_{0.5}NbO_3$ thin films by pulsed-laser deposition, *Applied Physics Letters*, Jul. 12, 1999, vol. 75, No. 2, pp. 265-270.

* cited by examiner

FIG. 2A  WIDTH 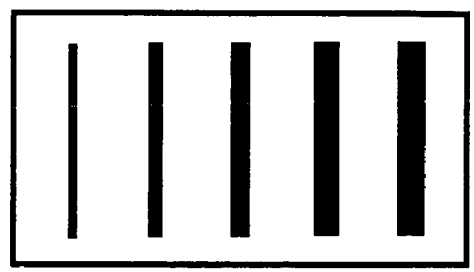
FIG. 2B  HEIGHT 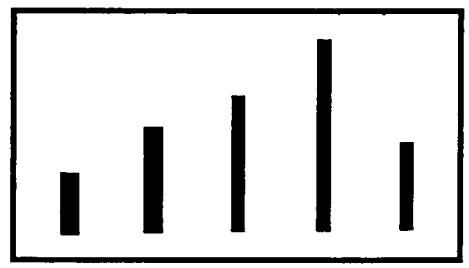
FIG. 2C  VERTICAL DISTRIBUTION 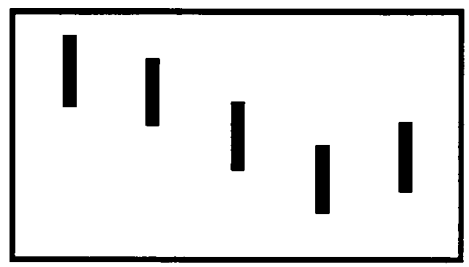
FIG. 2D  ORIENTATION 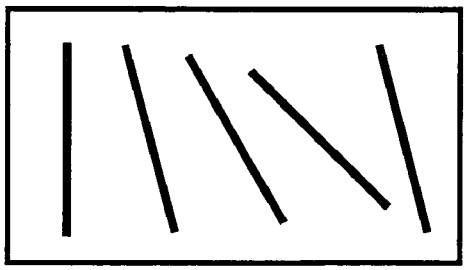
FIG. 2E  I/O 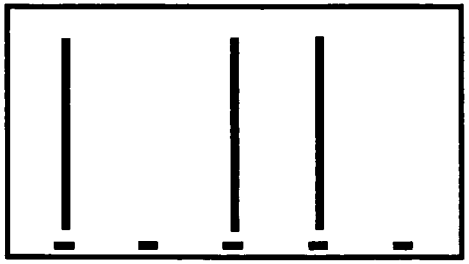

METHOD OF INTERROGATING A BARCODE

CLAIM OF PRIORITY

This application claims priority under 35 U.S.C. § 119 as a continuation of Swedish Patent Application No. 0402996-3, titled "MICROWAVE READABLE FERROELECTRIC BARCODE" to the same inventive entity as this application, and filed Dec. 9, 2004 in the English language, which is hereby incorporated by reference in its entirety. This application also claims priority under 35 U.S.C. § 119 of U.S. Provisional Application Ser. No. 60/594,961, titled "MICROWAVE READABLE FERROELECTRIC BARCODE" to the same inventive entity as this application, and filed May 23, 2005, which is also hereby incorporated by reference in its entirety.

FIELD OF THE INVENTION

The present invention relates to barcodes, to the methods and materials to fabricate such barcodes, as well as to the methods of how to write and read the information represented by barcodes. In particular, the invention relates to barcodes that are composed of dielectric materials.

BACKGROUND OF THE INVENTION

Today uniform product code (UPC) labels are on practically every product produced in the world. Optical barcodes have become so widely accepted because of their low production costs, device complexity, and high durability. These same properties which caused their success now limit their usefulness in commercial applications. The simple design has low production costs, but is severely limited in the amount of data it can represent. The design also allows for simple and cheap detection through optical reading systems. However, optical reading systems require a direct, unobstructed path for light to be emitted onto the barcode and then reflected back to the sensor. This unobstructed (i.e., "line-of-sight") property of optical read barcodes limits their usefulness. For example, to conduct inventory management, objects must be placed in a specific physical location for their identification information to be read.

To combat the "line-of-sight" problem posed by traditional barcodes, radio-frequency identification solutions have been developed. Radio-Frequency Identification (RFID) tags store and transmit identification information that is similar to the information stored in barcodes. A RFID system consists of an interrogation device that broadcasts a radio signal and a RFID tag which receives said radio signal. With a passive RFID tag, the radio signal power itself is used to power-up a small microchip within the tag, which then transmits its unique identification code back to the interrogation device. The radio waves used to interrogate RFID tags for can pass through many materials, therefore solving the "line-of-sight" issue present in optically read barcodes.

RFID technology does, however, have its own problems. RFID tags can be divided into two major categories: active and passive. Active RFID tags contain their own power source which increases the distance in which it can provide identification information. Problems with this type of tag include cost of production due to the complexity of such a device as well as maintenance issues, physical size and weight constraints, and power consumption. Passive tags overcome cost and complexity issues, but in turn have greatly restricted operability and flexibility. Because a microchip is embedded in an RFID tag, along with radio frequency receivers, front ends, and transmitters, the device complexity and associated cost is much higher than that of optical barcodes.

Because of economic issues industry has been tentative in its adoption of RFID. Wal-Mart Corporation recently rolled out an initiative to have all of their suppliers utilize RFID tagging to aid in their inventory management and supply chain. While this program has benefits, it raises a new problem of data redundancy. Not only will each product now have barcode identification information on it, but it will also have RFID Identification. The use of two identification methods for different purposes is costly and unneeded. Another problem with RFID technology is the separation between an object and its identification information. An object is not directly identifiable as it was when a barcode was embedded directly on the object itself. A tag is affixed to the object, therefore causing all relevant data to be associated with not the object itself, but with a tag on the object. If a tag becomes separated from the object the identity of that object is lost.

One example of the problems associated with data separation caused by RFID technology can be seen in the field of livestock tracking. Since the advent of RFID solutions; the agriculture industry has been attempting to utilize this technology for means of animal identification in the form of a RFID tag affixed to an ear tag placed on the animal. (See U.S. Animal Identification Plan—National Identification Development Team, available on the Internet at the U.S. AIP website information page, hereby incorporated by reference in its entirety.) Studies have shown that approximately 10% of ear tags become separated from the animal throughout its life cycle either by accidental separation, or through human removal. If data relative to an animal is associated with a RFID tag, and the tag becomes separated from the animal all data associated with that animal is also lost. Thus, with RFID technology, information is related not to the object itself, but to a tag which is then associated with the object. This three party identification solution is more complex than a direct identification solution, and is therefore less reliable and less permanent.

One solution to all the aforementioned problems with the above identification technologies is proposed in European Patent No. EP1065623A26 to J. F. P. Marchand, titled "Microwave Readable Barcode" (the EP '623 Patent"), which is hereby incorporated by reference in its entirety. The EP '623 Patent describes a microwave readable barcode that consists of conductive bars made from a conductive ink or conductive foil. Barcode information can be encoded using conductive bars of different lengths, different angles, or different positions. When the device is illuminated by a microwave signal, the encoded information can be read through the attenuation, or non-attenuation, of the signal by the conductive bars, and/or the scattering, or the non-scattering, of the microwave signal by the bars. A complete microwave readable barcode system includes conductive barcodes, a transmitter that radiates a microwave signal onto the barcode, and a detector that senses the microwave signal reflected from the conductive bars. Barcode systems can use multiple microwave signals that differ in one or more respects, such as polarization or wavelength.

While the approach disclosed in the EP '623 Patent solves two problems (the "line-of-sight" readability restrictions associated with optical barcode systems, and the data separation problem associated with RFID technology), the disclosed microwave readable barcodes have limitations and problems. The complexity of a device consisting of either conductive bars of conductive foil causes economic hurdles in the production of the precursor material and in the fabrication of the conductive barcode. Therefore, embedding of a conductive barcode in an object is difficult and costly. The oxidation/corrosion processes limit the reliability of the conductive barcode. High cost of biocompatible metals makes conductive barcodes non-feasible for animal labeling. Also, it is impossible to make an invisible conductive barcode.

Missing from the art is a barcode system that has increased commercial application with increased data representation, and overcomes the problems of data separation, "line-of-sight" issues, and production problems. The present invention can satisfy one or more of these and other needs.

SUMMARY OF THE INVENTION

The present invention relates to a dielectric barcode which is a pattern fabricated from a dielectric material, and a system for interrogating the dielectric barcode. In accordance with one aspect of the invention, a plurality of dielectric bars are arranged on or within a substrate. The dielectric bars are arranged in a spatial manner to encode information.

In another aspect of the invention, the dielectric bars are formed from a dielectric material having a suspension of a metallic material in a density insufficient to provide conductivity at an operating frequency of a remote interrogator.

In accordance with another aspect of the invention, a barcode interrogation system comprises a dielectric barcode formed from a plurality of dielectric bars arranged on or within a substrate in a spatial manner to encode information, a signal transmitter connected to a first antenna so as to radiate an interrogation signal on the dielectric barcode, a signal receiver connected to an antenna so as to receive a return signal from the dielectric barcode, and a processor connected to the receive signal and operable to decode the encoded information.

In yet another aspect of the invention, the interrogation system is operable to scan the interrogation signal through space to read the dielectric barcode. The system is capable to scan the signal by rotating the transmitting antenna, frequency shifting or phase shifting of the transmitted signal.

These and other aspects, features, steps and advantages can be further appreciated from the accompanying figures and description of certain illustrative embodiments.

BRIEF DESCRIPTION OF THE DRAWINGS

The invention together with further objects and advantages thereof, may best be understood by making reference to the following description taken together with the accompanying drawings in which:

FIGS. 2a–2e illustrate several classes of microwave readable dielectric elements.

Throughout the drawings, the same reference characters will be used for corresponding or similar elements.

DETAILED DESCRIPTION OF THE ILLUSTRATIVE EMBODIMENTS

Figure 1:
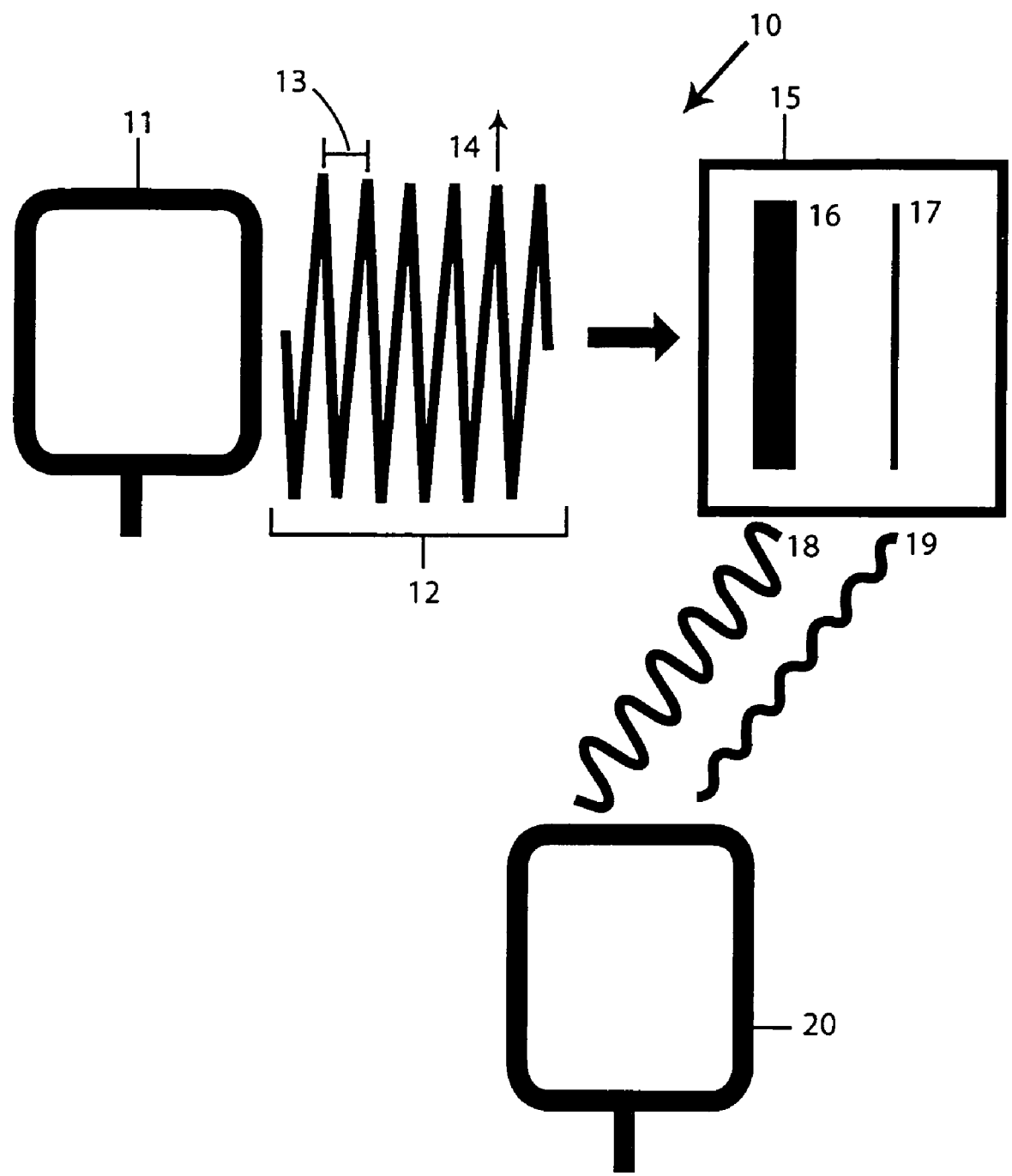
FIG. 1 illustrates a schematic rendition of a dielectric barcode system embodying the present invention.

By way of overview and introduction, presented and described are embodiments of a dielectric barcode which is a pattern fabricated from a dielectric material. The dielectric barcode is readable by a microwave device. A dielectric barcode formed from any dielectric material in any form is within the contemplation of this invention. For instance the dielectric barcode material can be in the form of an ink, a powder, or a solid material. An interrogating microwave signal propagates through the surrounding media where it is effectively reflected and/or absorbed by the dielectric barcode. Similar to an x-ray "shadow image" the pattern made from the dielectric material barcode can be visualized by the transmitted or reflected microwave radiation.

In an embodiment of the invention, the dielectric barcode is formed from a dielectric material with a suspension of a ferroelectric material, having a high dielectric permittivity, within the dielectric material. The high dielectric permittivity of the ferroelectric material creates a strong microwave contrast with the media surrounding the ferroelectric barcode at particular operating frequencies.

In another embodiment of the invention, the dielectric barcode is formed from a dielectric material provided with a fine powder suspension synthesized by chemical methods, and dispersed in suitable fluidic system to obtain a dielectric ink. A pattern is made from the dielectric ink by inkjet printing, injection, spraying, drawing or any other technique. Injection can be done by an impetus injection mechanism where the dielectric material with the fine powder suspension is deposited beneath a device's plastic subsurface or beneath the skin layer of an animal to form a dielectric barcode. A non-inclusive list of suitable materials for suspension within the dielectric material to form the dielectric inks includes, but is not limited to, heavy metals, heavy metal salts, piezo-electric ceramics, barium titanate ($BaTiO_3$), sodium potassium niobate ($NaKNbO_3$), and lead zirconium titanate ($PbZrTiO_3$ aka "PZT"). Metallic nano-particles (e.g., titanium nano-particles) are also suitable for suspension within dielectric materials to form the dielectric barcode. As is readily understood by a person of skill in the art, at different operating bands across the spectrum a particular dielectric material's perturbation to an electric field changes. For example, a dielectric material that is transparent at one operating band may become very lossy at another operating band. Thus, the suspension of particles within the dielectric material forming the dielectric barcodes optimizes performance at the particular operating band of interest. The density of these suspensions are enough to sufficiently alter the refractive and reflection properties of the dielectric material, but not dense enough to render the dielectric material conductive in the operating band.

Due to dielectric permittivity ($\epsilon$), the electromagnetic length in a dielectric material is $\sqrt{\epsilon}$ shorter than in a vacuum. This phenomenon allows for the dielectric barcodes to be significantly miniaturized. For example, a resonant barcode composed of dielectric material with the dielectric permittivity $\epsilon \sim 1000$ for 10 GHz (3 cm wavelength) operation will be only a millimeter in size. Dielectric barcodes can be transparent/translucent in the visible light spectrum, though highly contrasting for microwaves. In one embodiment to be used, as an example, for animal labeling, a biocompatible $Na_xK_{1-x}NbO_3$ ceramic could be the candidate material from which to make dielectric barcodes. Biocompatible ferroelectric ceramics can be injected under the skin remaining there as a non-degradable tattoo for the entire life of the animal.

U.S. Pat. No. 6,526,984 to Nilsoon et al., issued Mar. 4, 2003, and titled "Biocompatible Material for Implants" discloses the biocompatible ceramic $Na_xK_{1-x}NbO_3$, and is hereby incorporated by reference in its entirety.

FIG. 1 illustrates a schematic rendition of one embodiment of a dielectric barcode system 10. The system 10 includes a microwave transmitter 11 which emits a signal 12 that radiates outwards and towards a substance 15 having a readable dielectric element 16. The microwave signal 12 has a wavelength 13 and is polarized such that the E-field is in the vertical direction 14. However, the wavelength and field polarization are not limited to any one value or orientation, as would be understood by a person of ordinary skill in the art. The frequencies of interest range from around 100 kHz to over 100 GHz, and further up to and including the TeraHertz ($10^{12}$ Hz) frequency band. A range just above the operation of satellite dishes and mobile phones (about 90–100 GHz) through to adjacent to infrared frequencies used in remote controllers (about 30 THz), and more particularly, operating frequencies of about several Terahertz are believed to be beneficial.

In one embodiment, the readable element 16 is a ferroelectric bar formed from the biocompatible ceramic $Na_xK_{1-x}NbO_3$. So as to make the barcode resonance and polarization sensitive to the interrogating electromagnetic wave of signal 12, the readable element 16 has a length that is one-half the wave-length 13, and an axis that is parallel to the direction 14. Using the formula of wavelength equals the speed of light over frequency, the wavelength necessary to read various sizes of dielectric barcode elements can be calculated. Thus, $\lambda = c/v$ where:

$\lambda$ = wavelength (microns)

$v$ = frequency (Hertz), and $c = 3*10^{14}$ µm/sec (speed of light). Eq. 1

The required wavelength necessary to read a dielectric barcode element of a specific size can be calculated. For an embodiment operating in the TeraHertz operating band, a frequency of 1.0 THz has a wavelength of 300 µm, requiring a readable element 16 to have a length of 150 µm. For multiple readable elements in a single barcode, the readable elements would be spaced apart one-half the wavelength. From this information it is possible to calculate the overall width of this embodiment of a microwave readable barcode from the following equation:

$W = N(\lambda/2) + (N-1)(\lambda/2)$ µm where:

$W$ is the barcode width in microns, $N$ is the number of readable elements forming the barcode, and $\lambda$ = wavelength (microns). Eq. 2

Thus, applying Equation 2, the width of a barcode tag having 96 bits would be 96*150 (the elements)+95*150 (spaces between elements)=14400+14250=28650 µm=28.65 mm long.

Figure 3A:
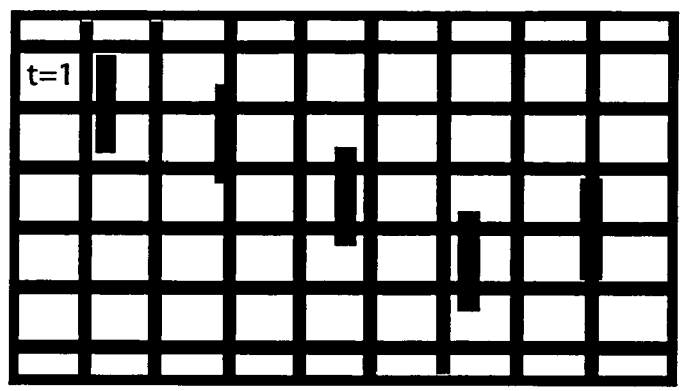
FIGS. 3a–3c illustrate time variant reading of dielectric elements.
Figure 3B:
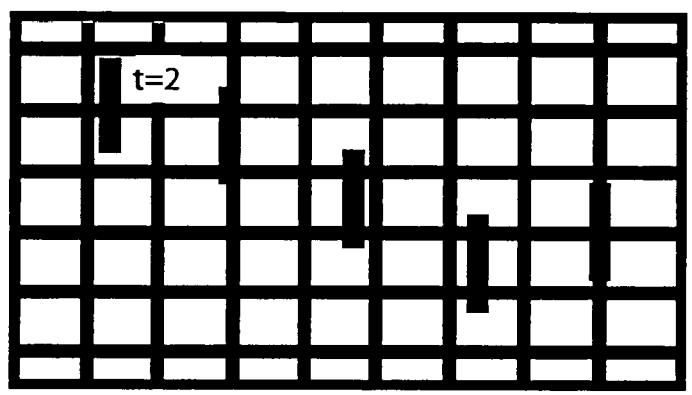
Figure 3C:
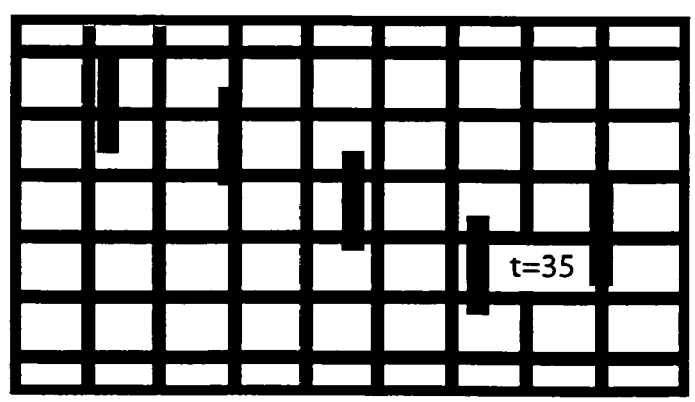

With reference to FIGS. 3a–3c, a time variant reading of the microwave readable barcode is illustrated. To resolve a tag of more than one dimension (i.e., a tag utilizing a 2-dimensional encoding scheme) a spatial relationship (e.g., an interstitial gap) must be established between elements. To accomplish this, a single microwave source can scan the tag area relative to the time constant to achieve a 2-D "image" of the tag, which can then be processed to extract the information therein. Thus, by collecting the readings relative to time and position an image of the barcode can be reconstructed and its information extracted.

There are many schemes known to a person of ordinary skill in the art to achieve a scan of the tag area. For example, an antenna (not shown) connected to the microwave transmitter 11 can be physically rotated in at least one degree of freedom (e.g., azimuth, vertical, roll, pitch and yaw) to move the peak of the transmitted signal 12 across a group of dielectric elements 16 which form a barcode. Alternatively, the phase or the frequency of the transmitted signal 12 can be varied to cause the beam collimation to move in spatial relation to the location of the dielectric elements. The antenna can be composed of an array of elements, where the inter-element phasing is controlled to adjust the beam's spatial location. These and other implementations and methods of scanning a transmitted signal through space are within the contemplation of the present invention.

With reference to FIG. 1, when the transmitted signal 12 strikes the dielectric element 16, the signal is partially scattered and partially attenuated. The scattered portion 18 of the signal 12 can be sensed by a sensor 20. Sensor 20 itself can be the same antenna connected to the transmitter 11, or a different sensor implementing the same or different technology as the antenna. The sensor further includes a processor capable of decoding the encoded information present in the dielectric barcode. As is readily understood, sensor 20 can be implemented by separate components of an antenna, a processor, and an output interface.

If the sensor 20 receives a scattered signal it determines that a dielectric readable element exists. In that case the sensor 20 produces a predetermined output signal. In a binary information system, the predetermined output signal indicates the presence of a readable element and could be a one or a zero. FIG. 1 also shows a dielectric bar 17 that is much thinner than the readable element 16. The dielectric bar 17 would only slightly scatter the signal 12. The sensor 20 would then produce another output signal, say a zero, based upon a missing (low scattered) signal. Of course, the dielectric bar 17 might be missing altogether.

While the foregoing discusses the use of binary information (zeros and ones), the present invention is not limited to only one type of encoding scheme. In another embodiment, a first ferroelectric bar of one length and/or orientation can represent any member of a set (such as a letter or a number). Further, a second dielectric bar of another length and/or orientation can represent another member of the set, and a third and other dielectric bars of other lengths and/or orientations might represent other members, and so on. By varying the wavelength and/or polarization of transmitted signal 12 these differing lengths and orientations can be sensed and the corresponding set members identified.

Inkjet printing technique can be applied to deposit dielectric layers and structures consisting of nano-sized dielectric particles. These dielectric particles can be synthesized by chemical methods and suspended in a suitable fluidic system. The rheological parameters of the fluids can be adjusted for inkjet printing. The resulting micron-scale patterns can be obtained with a high reproducibility and structure control. The dielectric local structure of the patterns can be studied by using a local dielectric probe technique as well as at nano-scale atomic force microscopy with a local capacitance probe can be employed. The deposited structures will have a chain-like self-alignment of the dielectric particles. Potential applications of this fast and versatile process are the production of low- and medium density dielectric mass storage patterns on almost any kind of substrate and for dielectric character recognition purposes. Printed patterns with minimal structure dimensions in the range of 50–100 μm are easy to achieve.

The illustrated embodiments of the present invention attempt to overcome the problems associated with the conventional identification methods discussed above. Dielectric barcodes solve the readability problem through utilizing microwaves as the method of extracting information from the tag. A dielectric barcode also solves the problem of data redundancy associated with the use of optical barcodes in conjunction with RFID technology. Dielectric barcodes can be constructed to utilize not only optical reading systems, but also quasi-optical systems (i.e., systems operating at millimeter wavelength bands) similar to that of RFID technology to be remotely identified as well. Dielectric barcodes overcome the problem of data separation as well. Since dielectric barcodes can be directly embedded or printed on an object in a similar fashion to optical barcodes instead of embodied in a tag which is affixed to an object, the identification information comes directly from the object itself instead of from a tag placed on the object.

In particular, a non-exhaustive list of advantages offered over the prior art by the various embodiments of the present invention includes:

providing cheap and reliable material for radio-frequency identification tags;

reducing the number of extra elements and eliminating power consuming units connected to the device, thereby allowing a small overall device size and complexity;

providing advanced encoding of the identification information in the form of spatial and temporal dispersion of the reflected/transmitted interrogating microwave signal;

allowing biocompatible barcode labeling of creatures;

providing invisible barcode patterns and/or a barcode pattern deposited beneath the surface of the coded sample.

Thus, while there have been shown, described, and pointed out fundamental novel features of the invention as applied to several embodiments, it will be understood that various omissions, substitutions, and changes in the form and details of the devices illustrated, and in their operation, may be made by those skilled in the art without departing from the spirit and scope of the invention. Substitutions of elements from one embodiment to another are also fully intended and contemplated. It is also to be understood that the drawings are not necessarily drawn to scale, but that they are merely conceptual in nature. The invention is defined solely with regard to the claims appended hereto, and equivalents of the recitations therein.

We claim:

1. A method of interrogating a barcode comprising the steps of:

creating a plurality of dielectric bars from a dielectric material having a suspension of metallic material in a density insufficient to provide conductivity at a microwave frequency of an interrogation signal;

providing a dielectric barcode formed form the plurality of dielectric bars, within a substrate, wherein the dielectric bars are arranged in a spatial manner so as to encode information;

providing a remote signal generation and remote reception system capable of remotely transmitting a microwave interrogation signal and remotely receiving a return microwave signal;

transmitting the microwave interrogation signal;

receiving the return microwave signal from the dielectric barcode; and processing the return microwave signal to extract the encoded information.

2. The method of claim 1 further including the step of scanning the microwave interrogation signal through a volume of space.

3. The method of claim 1, wherein the dielectric barcode is provided by one of spraying and injecting.

4. The method of claim 1, wherein the transmitting step transmits a signal in the range of about 90 GHz to about 30 THz.

5. The method of claim 1 used for animal labeling.

6. The method of claim 1 wherein the dielectric barcode is beneath the skin layer of an animal.

7. The method of claim 1 wherein the dielectric barcode is a non-degradable tattoo.

* * * * *